United States Patent [19]

Bonjean et al.

[11] Patent Number: 4,787,680
[45] Date of Patent: Nov. 29, 1988

[54] SEMI-RIGID AXLE FOR A VEHICLE

[75] Inventors: Didier Bonjean, Asnieres S/Seine; Raymond Deslande, Chalons S/Marne, both of France

[73] Assignee: Vallourec, Paris, France

[21] Appl. No.: 936,779

[22] Filed: Dec. 2, 1986

[30] Foreign Application Priority Data

Dec. 2, 1985 [FR] France ............................. 85 18367

[51] Int. Cl.$^4$ ............................................ B60B 35/06
[52] U.S. Cl. ................................. 301/124 R; 301/127; 280/689; 280/726
[58] Field of Search ............... 301/1, 124 R, 125, 127, 301/129, 131, 132, 133; 280/665, 689, 723, 726; 72/367

[56] References Cited

U.S. PATENT DOCUMENTS

| 702,101 | 6/1902 | Klein | 301/125 |
| 2,007,793 | 7/1935 | Crawford | 301/124 R |
| 2,218,127 | 10/1940 | Urschel | 301/124 R |
| 2,631,898 | 3/1953 | Long | 301/127 |
| 3,615,103 | 10/1971 | Döhring | 280/723 |
| 3,767,224 | 10/1973 | Schneeweiss | 280/723 |
| 3,804,467 | 4/1974 | Austermann | 301/124 R X |
| 4,429,899 | 2/1984 | Ohno et al. | 280/689 |

FOREIGN PATENT DOCUMENTS

| 776562 | 1/1935 | France . | |
| 898291 | 4/1945 | France | 301/124 R |
| 2292604 | 6/1976 | France . | |
| 2384565 | 10/1978 | France . | |
| 2521919 | 8/1983 | France . | |
| 564707 | 10/1944 | United Kingdom | 301/124 R |

Primary Examiner—Robert B. Reeves
Assistant Examiner—Russell D. Stormer
Attorney, Agent, or Firm—Dennison, Meserole, Pollack & Scheiner

[57] ABSTRACT

The invention relates to a U-shaped semi-rigid axle for a vehicle. The axle comprises a transverse portion pivotally connected to the body of the vehicle and two arms serving to mount stub axles on which the wheels are fixed. It is formed of a one-piece tubular structure, the central region forming the transverse portion (3) being so profiled as to present at least one double-wall flange portion, a bent region (12, 13) being provided at each end of the transverse portion, each bent portion being extended by an arm (14, 15) at the end of which is provided the fixing for the stub axle. The invention also relates to a process for producing the foregoing axle. The axle according to the invention can be used in particular as the back axle assembly of a motor vehicle.

10 Claims, 2 Drawing Sheets

SEMI-RIGID AXLE FOR A VEHICLE

The invention concerns a semi-rigid one-piece axle used in particular for the back axle assembly of a motor vehicle. The invention also concerns a process for producing such an axle. The axle is in the form of a U-shape, comprising a transverse portion which is pivotally connected to the body of the vehicle, and two arms, at the ends of which are fixed stub axles on which the wheels are mounted.

That axle makes it possible to provide for mounting and guiding the wheels and has an anti-roll function (to resist sideways tilting of the body of the vehicle).

According to the invention, the axle is of a one-piece structure which results from shaping a single length of tube.

Semi-rigid rear axles for vehicles are known, which perform the same two functions, but those axles are generally made in three parts: a transverse or cross member and two arms which are each mounted to an end of the transverse member, for example by welding. In fact, in order for a semi-rigid axle to be able to perform the functions which are expected of it, it is necessary to provide a transverse member which has sufficient rigidity in the flexural mode, linked to an adequate capacity for resilient deformation in a torsion mode.

In fact, the arms which are mounted to the two ends of the transverse member must be capable of turning relative to each other about the axis of the transverse member by resilient torsion thereof, with the axes of the wheels remaining virtually parallel to each other during such turning movement. In order to achieve that result, each arm must have both a high level of bending strength and a high level of torsional strength. Those strengths combined with the bending strength of the transverse member are in particular necessary in order to withstand the torsional and bending couples which are generated when taking a bend due to the grip of the tire on the ground.

By making the axle in three separate parts, each part thereof may be produced with the optimum characteristics, the parts then being assembled by known means, for example welding. The axles which are produced in that way suffer from the disadvantage of being relatively expensive as they involve using a number of components which have to be produced separately and then rigidly fixed together. In addition, such axles are relatively heavy because, at the location of the assembly areas, the sections thereof have to be reinforced.

Research has been undertaken into the possibility of producing a semi-rigid axle of the type which has just been described, which is of lighter weight in comparison with existing axles, being of a one-piece structure which does not require any assembly operation and which moreover affords the mechanical characteristics which permit it to perform the two main functions which have just been set forth above.

The U-shaped semi-rigid axle which is the subject of the present invention has a tubular one-piece structure produced from a single length of tube. It comprises a central region which forms the transverse member and which is of such a profile as to have at least one double-wall limb or flange portion; at each end of the transverse portion, beyond the profiled region, there is a region which is bent substantially at a right angle and which is extended by an arm, at the end of which is provided the fixing of the stub axle on which the wheel will be mounted. The thickness of the tubular axle defined in the above-indicated manner may be constant over the entire length of the component or it may have variations in order better to be adapted to the stresses that it must withstand, while being of minimum weight.

The semi-rigid axle is advantageously made of steel.

The profile of the transverse portion, when considered in section perpendicularly to the axis thereof, is preferably in the form of an L, a T, a U, a V, an X or an H. In the bent region, the section of the tube is advantageously substantially circular.

In the profiled central region, the two walls of at least one limb or flange portion are advantageously in contact with each other. The arms are of a circular or ovalised section or other similar tubular shapes, over at least a part of the length thereof.

The invention also concerns a process for producing a U-shaped semi-rigid axle, using a single length of a metal tube, of circular or non-circular section, in which the central region thereof is deformed so as to impart thereto the form of a rectilinear shaped member comprising at least one double-wall flange portion, said shaped member forming the transverse portion of the axle, and in which the tubular portion beyond each end of the profiled region is bent substantially at a right angle, reserving a sufficient length of tube beyond each bent region to form the axle arms, at the ends of which will be fixed the stub axles on which the wheels will be mounted.

Advantageously, a rotationally symmetrical tube is used.

It is also advantageous to use a steel tube. The central region of the tube may be deformed to produce the shaped member, with or without a variation in thickness. The deformation of the central region is advantageously effected in such a way that the two walls of at least one flange portion come into contact with each other. The central region may be deformed in particular in such a way as to produce a shaped member which is of L, V, T, U, X or H-shaped section. The axle arms may be of circular or ovalised section or other similar tubular shapes. It is also possible to modify the section of the end regions of the arms so as to facilitate fixing of the stub axles on which the wheels will be mounted.

The following text and accompanying drawings describe, without limitation, a particular embodiment of the invention.

Figure 4:
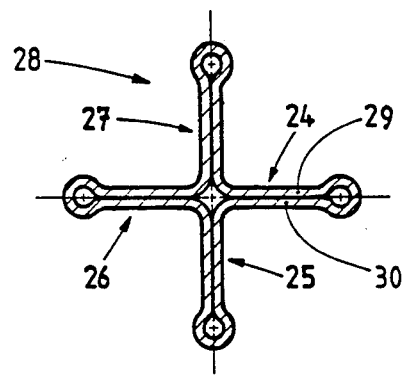
Figures 5, 6:
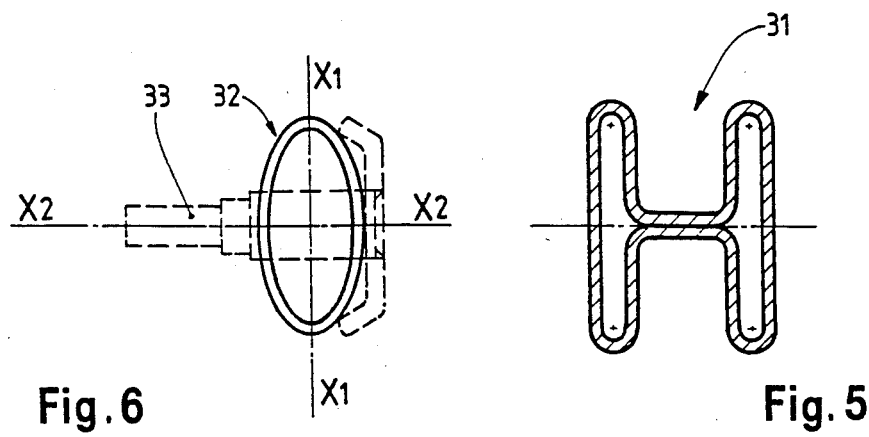

FIG. 4 is a sectional view of a section of transverse portion of the axle according to the invention in which the two walls of each flange portion are in contact with each other, FIG. 5 is a sectional view of a section of the transverse portion of the axle according to the invention, of H-shaped configuration, and FIG. 6 is an axial view of the ovalised end of an axle arm in the region in which the stub axle is fixed in position.

Figure 1:
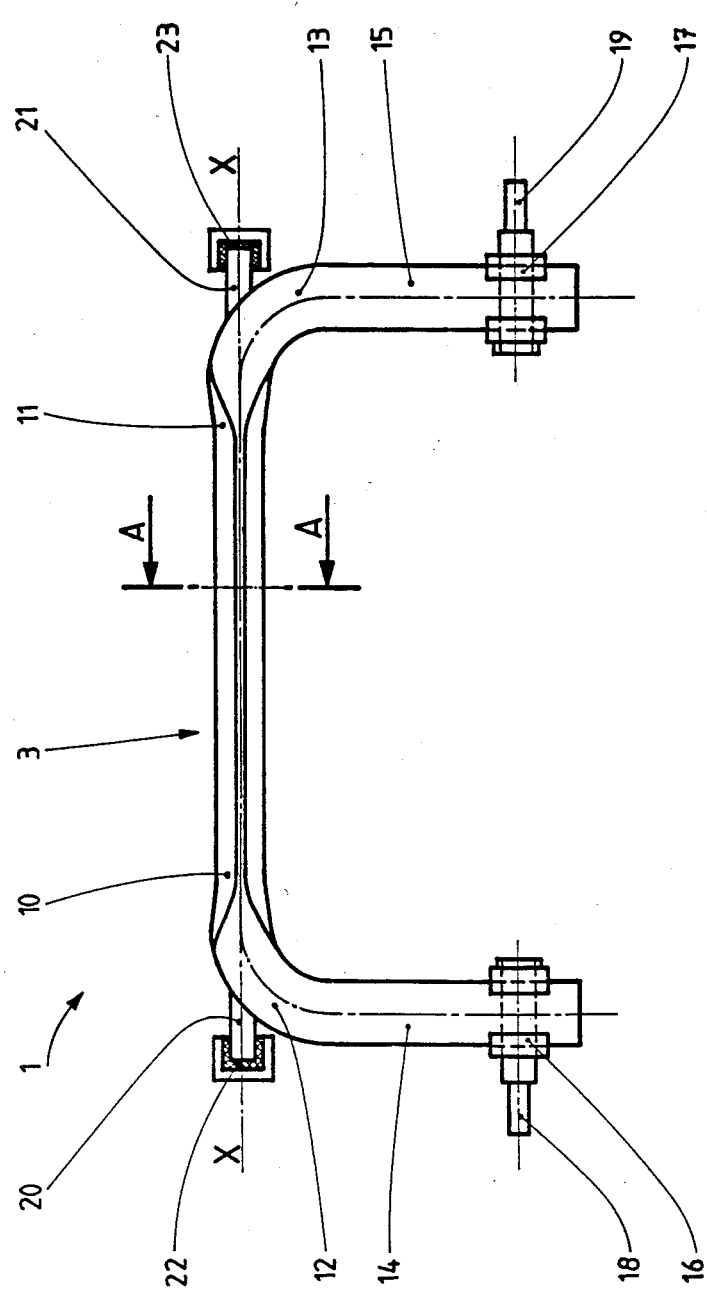
FIG. 1 is a plan view of an axle according to the invention.

FIG. 1 is a diagrammatic view of a one-piece semi-rigid axle 1 according to the invention.

Figure 2:
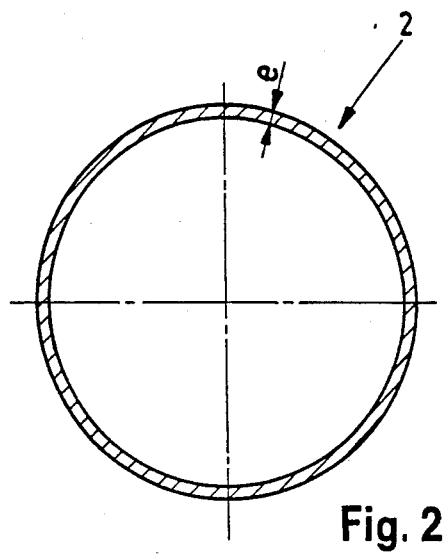
FIG. 2 is a sectional view of a tube for carrying out the invention.

The axle is produced from a single length of a rotationally symmetrical steel tube whose section 2 is shown in FIG. 2 on an enlarged scale with respect to FIG. 1.

The tube is of a constant thickness e from one end to the other. The transverse portion 3 of the axle is produced by deformation of the central region of the tube.

Figure 3:
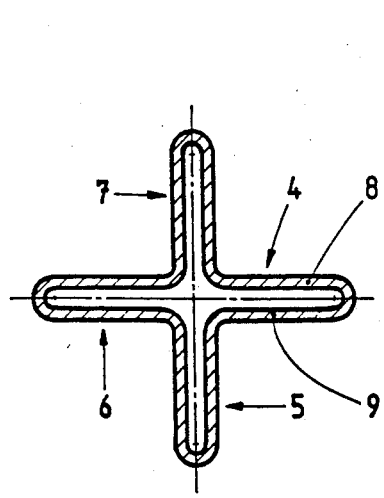
FIG. 3 is a view in section taken along line A—A in FIG. 1.

The form of a rectilinear shaped member of which the section on line A—A is shown in FIG. 3 is thus imparted to the tube. It will be seen that the shaped member comprises four limb or flange portions 4, 5, 6 and 7 which are arranged in an X-shape around the axis X—X. Each of the flange portions comprises a double wall as at 8, 9 which results from shaping of the initial tube. Such a configuration has a high level of bending strength which is little lower than that of the initial configuratoon of the tube. The shaped member has a much lower level of resilient torsional strength than that of the initial tube and in addition it permits substantial torsional deformation of one end of the transverse portion with respect to the other, without going outside the elastic range. It will be seen that at each of its ends 10 and 11 the transverse portion is prolonged by a tubular region which is bent at a right angle, as at 12 and 13, and a straight tubular arm 14 and 15. In the illustrated embodiment, the arms are of a rotationally symmetrical section.

Fixed to the end of each of the arms are attachment means 16 and 17 which carry stub axles 18 and 19 on which the wheels will be mounted.

The axle is connected to the body (not shown) of the vehicle in known manner by pivotal mounting means such as journals 20 and 21 which are fixed to the axle along an axis which is parallel to the axis X—X of the transverse portion and which are mounted rotatably in elastic bearings 22 and 23 which are fixed with respect to the load-carrying structure of the vehicle body. It will be appreciated that such an axle permits rotary movement of one of the arms 14 or 15 with respect to the other in a plane substantially perpendicular to the axis X—X, by virtue of the capacity for resilient torsion of the transverse portion, with the generation of a return torque which tends to return the two arms to the same plane. The maximum angle of rotary movement of one of the arms with respect to the other, with resilient return thereof, depends on the mechanical characteristics of the steel forming the transverse portion, the profile thereof and the dimensions thereof.

Springs (not shown) which are connected to the body of the vehicle and to each of the two arms permit the load of the vehicle to be transmitted to the wheels in known manner. The springs, in known manner, are coil springs, torsion bars or the like. Also in known manner, dampers (not shown) permit the rotary movements of the arms around the axis (X—X) to be controlled.

Different profile configurations may be imparted to the transverse portion in order to increase its capacity for resilient torsional deformation while retaining a high level of bending strength. FIGS. 4 and 5 show two sections of shaped portions which can be produced in the central region of a tube to form the transverse portion of an axle according to the invention. In the construction shown in FIG. 4, the four flange portions 24, 25, 26 and 27 of the shaped portion 28 comprise double walls as at 29 and 30 which are pressed firmly against each other, thereby increasing the capacity for torsional displacement.

The H-shaped section of the portion 31 shown in FIG. 5 permits the bending strength of the transverse portion to be privileged in respect of stresses oriented in particular directions in respect of which there is a wish to achieve the highest level of bending strength. As regards the arms, they may be of a circular section as in the construction shown in FIG. 1. It is also possible for them to be of a more or less ovalised section or other relatively similar tubular shapes in order also to privilege same in respect of their bending strength in a given direction. In the structure shown in FIG. 6, the illustrated arm cross-section 32 is ovalised in such a way that its major axis of symmetry X1—X1 is perpendicular to the axis X2—X2 of the stub axle 33 which is shown in broken lines. That limits the capacity for bending of the arm when it is rotationally displaced about the axis X—X of the transverse portion of the axle. It may be advantageous to ovalise the section of the arm in such a way that the major axis thereof is in contrast parallel to the axis of the stub axle in order to reduce transverse displacement of the wheels when taking a bend. It is also possible to modify the section of each arm in the vicinity of the stub axle fixing region so as to make the fixing operation easier. It is possible in particular to provide for local deformation of the section of the arm to give it for example a U-shaped configuration, permitting the stub axle fixing means to be mounted in position more easily.

By way of example, taking a tube of circular section of a diameter of 70 mm and a thickness of 1.7 mm, of steel E36 in accordance with standard NFA 35501 and having in the reference state an elastic limit E 0.2% of 360 MPa, an axle according to the invention was produced, which complies with the following characteristics:

transverse portion: shaped length 700 mm, X-section as shown in FIG. 3, length of flange portion (8, 9) 22 mm;

arm: ovalised section as shown in FIG. 6, length along axis X1—X1 90 mm, length along axis X2—X2 46 mm, being capable of resisting in a torsional mode a torque of 300 Nm with an angular deformation of the transverse portion of 20°.

The axle according to the invention may be made from materials other than steels, the choice of material being within the normal area of competence of the axle designer. In order to enhance the mechanical characteristics, it is possible if appropriate in the case of a steel axle to carry out a total or localised heat treatment after the axle according to the invention has been suitably shaped.

The very large number of modifications or adaptations which may be made in the arrangement and the process of the subject-matter of the present invention do not constitute a departure from the scope covered thereby.

We claim:

1. In a semi-rigid one-piece vehicular axle construction including a pair of tubular axle arms, the combination comprising, a generally U-shaped tubular body having a central transverse portion and a pair of axle arms extending perpendicularly therefrom in a common plane, said axle arms each including a stub axle, said transverse portion being formed to include a cross-sectional profile region of double wall thickness and having at least one flanged portion and being prolonged at each end, beyond the profile region, by a tubular region bent to merge at a right angle with each of said axle arms.

2. An axle according to claim 1 wherein, in the bent regions, the tubular section is substantially circular.

3. An axle according to claim 1 wherein, in the central transverse portion, the two walls of at least one flange portion are in contact with each other.

4. An axle according to claim 1 wherein, at least over a part of their length, the axle arms are of a circular tubular cross-section.

5. An axle according to claim 1 wherein, at least over a part of their length, the axle arms are of an ovalized tubular cross-section.

6. An axle according to claim 1 wherein the tubular body is made of steel.

7. An axle according to claim 1 wherein the thickness of the tubular body varies at defined portions located on the length thereof.

8. The method of making a one-piece semi-rigid vehicular axle including the steps of forming a single length of metal tubing into a U-shaped configuration to define a central portion and an axle arm portion at each end thereof, deforming a part of said central portion to include a rectilinear section while retaining said axle arm portions in tubular form having at least one double walled flanged portion, and attaching a stub axle to each of said axle arm portions.

9. A process according to claim 8 wherein the axle arms, over the major part of their length, are formed of circular cross-section.

10. A process according to claim 8 wherein the axle arms, over the major part of their length, are formed of oval cross-section.

* * * * *